United States Patent
Buontempo et al.

[11] Patent Number: 5,416,325
[45] Date of Patent: May 16, 1995

[54] FOURIER TRANSFORM INFRARED SPECTROMETER

[75] Inventors: Joseph T. Buontempo, Rochester, N.Y.; Stuart A. Rice; Roland Winston, both of Chicago, Ill.

[73] Assignee: ARCH Development Corporation, Chicago, Ill.

[21] Appl. No.: 55,696

[22] Filed: Apr. 29, 1993

[51] Int. Cl.⁶ .............................................. G01J 5/08
[52] U.S. Cl. ............................ 250/339.08; 250/353
[58] Field of Search ................ 250/353, 339, 339.08

[56] References Cited

U.S. PATENT DOCUMENTS

| | | | |
|---|---|---|---|
| 2,984,747 | 5/1961 | Walker | 250/353 |
| 3,923,381 | 12/1975 | Winston | 359/852 |
| 3,957,031 | 5/1976 | Winston | 126/695 |
| 4,003,638 | 1/1977 | Winston | 359/852 |
| 4,045,246 | 8/1977 | Mlavsky et al. | 136/246 |
| 4,114,592 | 9/1978 | Winston | 126/683 |
| 4,130,107 | 12/1978 | Rabl et al. | 126/684 |
| 4,240,692 | 12/1980 | Winston | 385/146 |
| 4,382,656 | 5/1983 | Gilby | 385/146 |
| 5,254,858 | 10/1993 | Wolfman et al. | 250/339 |

OTHER PUBLICATIONS

J. Kachmarsky, C. Belorgeot, A. Pluchino and K. D. Möller, "Far-infrared high-resolution Fourier transform spectrometer: applications to H₂O, NH₃, and NO₂ lines." *Applied Optics,* vol. 15, No. 3 (Mar. 1976) pp. 708–713.

*Primary Examiner*—Constantine Hannaher
*Attorney, Agent, or Firm*—Reinhart, Boerner, Van Deuren, Norris & Rieselbach

[57] ABSTRACT

A Fourier transform infrared spectrometer. A system includes a non-imaging concentrator coupled to an infrared detector enabling optimized detection of a signal in the Fourier transform infrared spectrometer.

8 Claims, 2 Drawing Sheets

FOURIER TRANSFORM INFRARED SPECTROMETER

The present invention is concerned with a Fourier transform infrared (FTIR) spectrometer and more particularly is concerned with an FTIR spectrometer whose detector is coupled to a non-imaging concentrator. The concentrator can include, for example, a compound parabolic concentrator, a dielectric total internal reflection concentrator and a compound elliptical concentrator.

FTIR spectrometry is capable of providing particularly significant information regarding surface state chemistry which is essential for understanding catalytic reactions on surfaces, surface molecular structure and other such surface properties. FTIR spectrometry has been used to advantage in these surface science areas, but the level of detectable signal relative to noise makes use of FTIR spectrometry problematic and virtually useless under many useful conditions of measurement.

It is therefore an object of the invention to provide an improved FTIR spectrometer and method of use.

It is another object of the invention to provide a novel FTIR spectrometer having a non-imaging concentrator coupled to the FTIR sensor.

It is a further object of the invention to provide an improved FTIR spectrometer detection system for minimizing noise and optimizing detectable signal.

It is still another object of the invention to provide an FTIR spectrometer with an improved device and method for coupling a spectrometer detector to an infrared concentrator.

It is an additional object of the invention to provide a novel FTIR spectrometer whose output beam has a large etendue which is fully usable by the detector.

These and other objects of the invention, together with the manner of operation and use thereof, will be set forth in the Detailed Description provided hereinafter and in the following described drawings.

DETAILED DESCRIPTION OF PREFERRED EMBODIMENTS

Figure 1:
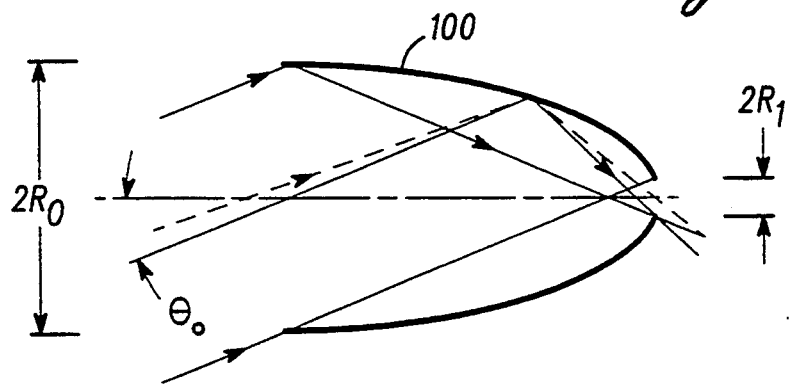
FIG. 1 is a schematic cross-sectional view of a compound parabolic concentrator (CPC) with illustrative example infrared beam paths shown.

In measuring low-intensity light it is necessary to maximize the ratio of the rms signal to the rms noise, S/N, where S is that portion of the detector output current or voltage that is coherent with the light and N is that which is not. The noise can arise from three sources. The first source of noise is the fluctuation in the amplitude of the light itself, which results from the random nature of photoemission. This source of noise imparts the ultimate limit to light detection. The second source of noise is due to amplitude fluctuations in the background radiation emitted by objects in the environment as a result of their nonzero temperature. This noise contribution can be approximated as blackbody radiation whose spectral distribution is given by Planck's law, which predicts a maximum value at $\lambda$ ($\mu$m)$=(2.897\times10^3)T_B$, or $\approx 10$ $\mu$m when $T_B=295°$ K, where $T_B$ is the temperature of the background objects. Thus, the IR region is inherently plagued by background radiation noise fluctuations, while the ultraviolet and visible regions can be made free of background interference. The final source of noise is the detection system itself, which includes the detector and the associated electronics, though noise from the latter can often be made negligible.

The mount of noise at the output of a detector can be represented by a figure of merit, the noise equivalent power (NEP), which is the rms power of sinusoidally modulated light incident on a detector which produces an S/N of 1:

$$NEP = \frac{P}{S/N} = \frac{P}{V_S/V_N} = \frac{P}{I_S/I_N}, \tag{1}$$

where P is power, $V_S$ and $I_S$ are signal voltage and current, and $V_N$ and $I_N$ are noise voltage and current. The reciprocal of the NEP is defined as the detectivity (D), and is a measure of the minimum detectable incident light power for the given conditions. NEP and D are dependent on the temperature of the background, the detector temperature, area, and field of view, the gain and bandwidth of the detection system, and the wavelength and modulation frequency of the incident light.

Because the ultraviolet and visible spectral regions can be rendered free of interfering background radiation noise, it is possible to achieve excellent low-intensity light detection with a suitable very low-noise detector. Of primary importance is a photomultiplier tube (PMT), which introduces noise mainly through the dark current arising from the random thermal excitation of electrons, and has $D \approx 10^{16}$ at room temperature. By cooling of the PMT, the dark current can be made negligible, so that then $D \approx 10^{19}$, which corresponds to about 1 photon/second. For comparison, the detectivity of the dark adapted human eye is about 10 to 100 photons/s. For detecting low-intensity ultraviolet and visible light, near-ideal performance (i.e., limited only by light fluctuations) can be achieved by using a cooled PMT with a high quantum efficiency for the spectral region of interest.

The IR spectral region, on the other hand, is plagued by background radiation, which limits the minimum detectable power. Thus, IR detectors usually do not have to be noiseless to be useful, but must introduce less noise than that from the background. An IR detector operating in this condition is said to be a background-limited photodetector, with a level of performance achievable by many modem IR detectors, though such detectors often require operation at very low temperatures. Because D is dependent on the square root of both the detector area and the detection bandwidth, the comparison of IR detectors independent of these factors is facilitated with a figure of merit, which has been defined as $$D^* = D(a_D \Delta f)^{\frac{1}{2}} = \frac{S}{N} \frac{(a_D \Delta f)^{\frac{1}{2}}}{P} \left[ \frac{cm \, Hz^{\frac{1}{2}}}{Watts} \right] \quad (2)$$

where $a_D$ is the detector area and $\Delta f$ is the bandwidth. In general, the wavelength and modulation frequency used to determine $D^*$ must be specified, and the background temperature is taken to be 290°–300° K. The field of view is chosen to bring the background noise down to the detector level while allowing adequate light to be brought to the detector. In practice, the field of view is usually limited by a cold shield with a circular aperture defining a conical field of view with cone angle equal to $2\phi$. For a detector that does not add any noise of its own, the dependence of $D^*$ on $\phi$ is given by $$D^*(\phi) = \frac{1}{\sin \phi} D^*(90°),$$

where $D^*(90°)$ is the full hemispherical field of view. For real detectors, limiting the field of view will increase $D^*$ until the detector noise equals the noise in the background radiation.

There are two classes of IR detectors, namely thermal and photon detectors. Thermal detectors, including thermocouples, bolometers, and pyroelectrics, produce an output signal proportional to the increase in temperature of the sensing element induced by exposure to light. Photon detectors, such as photodiodes and photoconductors, convert photons directly to mobile charge carriers, which are then measured as a current or voltage. Assuming background-limited conditions for a background temperature of 300° K. and a hemispherical field of view, the maximum possible $D^*$ for ideal thermal detectors and photoconductors has been determined, (i.e., for which all incident energy is convened into signal). For an ideal thermal detector, $D^* = 1.8 \times 10^{10}$ and is independent of wavelength. For an ideal photoconductor, $D^*$ is dependent on wavelength with a minimum of about $4 \times 10^{10}$ at about 10/am. One reason for the superior $D^*$ of ideal photoconductors is that they have a limited spectral range, which makes them sensitive to less background noise. For most real thermal detectors, $D^* \approx 10^8$–$10^9$, while photon detectors can have $D^*$ values within a factor of two of the ideal value.

In addition to limiting noise as much as possible to maximize the ratio S/N, it is also important to transfer as much light as possible from the source to the detector through the optic path and sample. However, to achieve such high $D^*$ values, IR photon detectors are made with a very small area, typically 1 mm². This small detector target would pose no problem if one were transferring energy from a point source, since a paraboloid or ellipsoid reflector can bring a point source to a small, sharp focus. But the same small image size is not possible with light from an extended source because the source radiance (power per unit area per solid angle) must be conserved throughout any optical system, assuming no losses due to absorption, scattering, or obstruction. Thus, for a source of area $a_0$ and angular extent $\theta_0$ (.i.e., the maximum angle of divergence with respect to the optic axis), the area and angular extent anywhere in the optical path is given by $$n_1^2 a_1 \sin^2 \theta_1 = n_0^2 a_0 \sin^2 \theta_0 \quad (4)$$

where $n_1$ and $n_0$ are the refractive indices of the respective media. Note that the conserved quantity is often given in the paraxial approximation as $n^2 a \theta^2$, but this is not appropriate for the large angles that will be of concern in the application we consider. If we wish to condense the source to an area as small as possible to fill the detector area, it is seen from Eq. 4 that the smaller we make $a_1$, the larger $\theta_1$ must become. By observation that the largest that $\theta_1$ could possibly be is $\pi/2$, the maximum concentration ratio is shown to be $$C_{max} = \frac{a_0}{a_1} = \left[ \frac{n_1}{n_0 \sin \theta_0} \right]^2 \quad (5)$$

where $a_1$ is the smallest possible value for a given $a_0$ and $\theta_0$.

Though $C_{max}$ is the maximum concentration ratio possible in principle, we need to know how close we can come to this value in practice. Without substantial effect, we can ignore losses and imperfections in real materials and concentrate on the limitations inherent in the design of optical systems. For this purpose it is convenient to use the f-number, the focal length divided by the aperture, which is a direct measure of the light-gathering power of the optical system. It has been shown from Eq. 5 that it is possible to achieve the maximum concentration ratio with an $f/0.5$ optical system which does not possess point-imaging aberrations [i.e., spherical, off-axis (coma), or chromatic aberrations], also known as blurring aberrations. Conversely, $f/0.5$ is in principle the smallest $f$-number that an optical system can have and still produce a sharp image. However, in practice it is exceedingly difficult to design a lens or mirror system with $f/0.5$ and no point imaging aberrations, so the image blurs to a size larger than the minimum $a_1$. Although aberrations are often thought of as minor corrections to an image, at $f/0.5$ the aberrations become large and severely depress the concentration ratio.

The extent to which it is possible to eliminate aberrations from image-forming systems has not been fully determined, but it appears that it is not possible to achieve $C_{max}$ with imaging optics. In fact, most optical systems are limited to $f/1$, and even this focal ratio has significant aberrations. For example, not only does an $f/1$ spherical mirror have spherical aberration, but in addition, because of its small focal length, the mirror must be used far off-axis, which both produces large coma and creates a situation in which the detector can partially block the path of the incoming beam. Although an off-axis parabola escapes the spherical aberration problem and allows unobstructed access for the incident light, it inherently has large off-axis aberrations. An $f/1$ lens not only has spherical and off-axis aberrations, but also introduces chromatic aberration. Of course, multielement lens designs can and have been used, but these become more complex and still are not aberration free. This problem is best seen in high-quality camera lenses, which have many elements yet are still not aberration free and are rarely faster than $f/1$. These limitations of imaging optics are rather severe when such optics are used to collect low-intensity light, as the irradiance (power per unit area) is inversely proportional to the square of the $f$-number. Thus, even a perfect $f/1$ system would provide a factor-of-four less light than $C_{max}$, and a real system is expected to be much worse.

Typically, an optical imaging system is designed with attention to producing a good image by distributing distortion and point-imaging aberrations throughout the image. However, undistorted imaging and good point imaging within the image are irrelevant when one is attempting to maximize light concentration. All that is needed is good point imaging at the edge of the image and internal aberrations which do not push rays outside this edge, so that $a_1$ is a minimum. Unfortunately, for imaging optics this approach is of little help because at low $f$-number the marginal rays are especially difficult to control, and their resulting blur significantly increases $a_1$. This problem has been overcome by developing an algorithmic method, called the edge-ray principle, for designing optical elements with surfaces that constrain all meridional rays at the extreme angle $\theta_0$ to good point imaging at the rim of $a_1$. All meridional rays less than $\theta_0$ fall inside $a_1$. Skew rays are not taken into account explicitly and, as a result, sometimes miss $a_1$, lowering the efficiency by a few percent. This design technique results in optical elements, called concentrators, which produce a spot with very large distortion and point imaging (blurring) aberrations inside $a_1$. In fact, typically the image is lost entirely, which earns this discipline the seeming oxymoron "nonimaging optics." Because the concentrators can tolerate certain aberrations, their design requires less severe constraints than those required for perfect imaging.

A nonimaging concentrator has been developed using the edge-ray principle and is the compound parabolic concentrator (CPC). We show in FIG. 1 a schematic cross section of a CPC 100 which accepts a beam of area $a_0$ and maximum converging angle $\theta_0$ and concentrates the beam down to area $a_1$ at the exit aperture of the CPC 100. The edge-ray principle dictates that the curve EF be a section of a parabola with focus at point M such that all rays at $\theta_0$ will image sharply at the edge. Likewise, point F is the focal point for LM. Rays at angles less than $\theta_0$ will emerge between F and M, while those at angles greater than $\theta_0$ are rejected. Revolving this cross section around its symmetry axis results in a three-dimensional form which is the CPC. Designs based on this method have come very close to $C_{max}$ (for example $\approx 95\%$ for $\theta_0=10°$ and $\approx 99\%$ for $\theta_0=60°$). As indicated above, the main reason for CPCs not reaching 100% $C_{max}$ is the contribution from skew rays that exist in real systems.

We have therefore used the CPC 100 to concentrate the weak extended light reflected from the surface of water onto an IR detector, thereby increasing S/N sufficiently to measure the weak IRRAS bands from a Langmuir monolayer of heneicosanol ($C_{21}H_{43}OH$) at surface areas of 24 and 42 Å$^2$/molecule.

The detection optics begin with a 90° off-axis parabola portion for the CPC 100 ($f=59.7$ ram), which brings the beam to a spot with a diameter of 9 mm and $\theta_0=9°$. To concentrate this spot to one with a diameter of 1 mm so that it is entirely within the sensitive area of the detector would require $C_{max}=(4.5)^2/(0.5)^2=81.0$. We chose to use an external reflection CPC 100 machined out of copper and plated with gold to provide a high reflectivity in the IR. Although it is also possible to make solid dielectric CPCs which are based on total internal reflection, the external-reflection CPC 100 avoids the need to find materials that have high IR transmittance at all wavelengths of interest. More importantly, unless a solid CPC is in effective optical contact with the detector, large losses will be incurred at the interface between the detector and the CPC 100. However, in using the external reflection CPC 100, $n_o=n_1\approx 1$, so we lose the advantage of the higher concentrating power that could be achieved if $n_1>n_0$. Thus, the best we can do is $C_{max}=1/\sin^2(9)=40.9$, which is not enough to produce a spot with a 1-mm diameter. As a result, we had to compromise in the design of the CPC 100. Since a 1-mm spot would leave room at the corners of a 1-mm×1-mm detector, using the CPC 100 with an exit diameter of 1.2 mm and an entrance diameter of 7.7 mm allowed us to pick up most of the incoming light.

Figure 2:
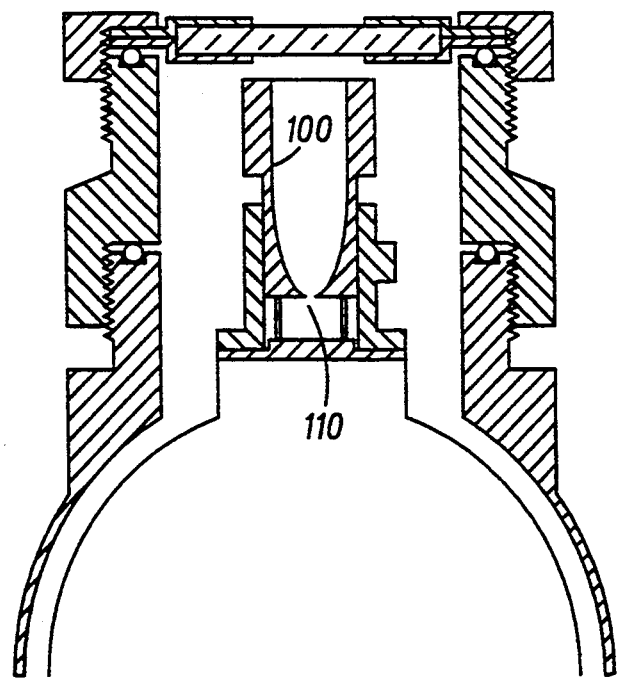
FIG. 2 shows a cross-sectional view of a CPC disposed in an infrared detector housing.

Since $\theta_1=\pi/2$, as shown in FIG. 2 the exit aperture of the CPC 100 should preferably be located within several thousandths of an inch of detector 110 so that the latter will intercept most of the emerging light. The preferred detector 110 was a liquid-nitrogen-cooled midband HgCdTe detector (Infrared Associates, FTIR-MB-1) for which $D^* \approx 1.5\times 10^{10}$ at its peak at 600 cm$^{-1}$. The detector window and field-of-view limiting cold shield were removed to allow access to the detector 110, which sits inside a "flatpack" package. Because the package rises 0.020 in. above the detector surface, it appeared at first to present a problem in bringing the CPC 100 close enough to meet our requirement. However, the package was actually beneficial to the proper positioning of the CPC 100 above the detector 110 after the step of turning down the wall of the CPC 100 and resting it on the flatpack. The mount to hold the CPC 100 in place was put in thermal contact with the liquid nitrogen cold finger to limit the background radiation from the CPC 100 itself.

Figure 3:
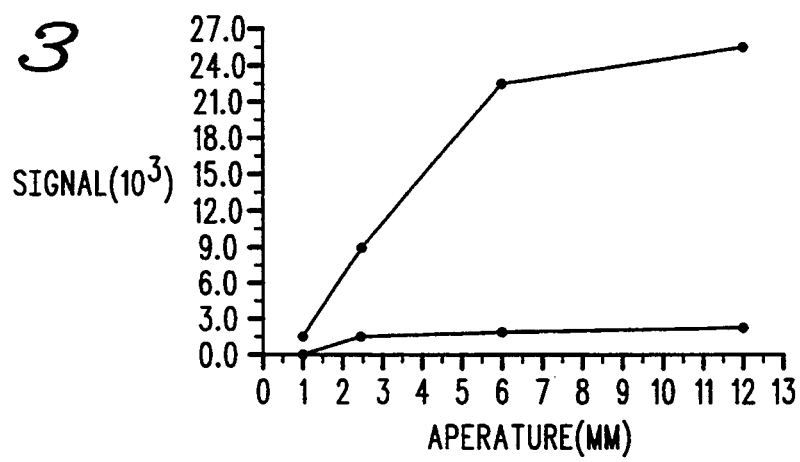
FIG. 3 illustrates a comparison of data accumulated with use of a CPC (top curve) and without a CPC (bottom curve) coupled to an infrared detector.

In FIG. 3 we compare the signal from the detector 110 with and without the CPC 100 as a function of the aperture in front of the globar source. No polarizer was used in this comparison. For the detector 110 without the CPC 100 the same off-axis parabola described above was used to direct the beam onto the detector 110. Other focusing elements, such as spherical and elliptical mirrors, were also tried in various configurations, but without much improvement. It is clear that without the CPC 100 the signal rapidly levels off as the spot size overfills the detector 110. Indeed, this observation is what led us to the idea of using another means to collect all the available light. With the CPC 100 the signal does not level off as quickly and the overall intensity detected is increased dramatically, with the ratio of the signal with the CPC 100 to that without the CPC 100 increasing with the aperture. At the largest aperture, which was used to obtain infrared spectra, the CPC 100 provides an increase in signal by a factor of 15. In these preferred embodiments the output beam of the FTIR spectrometer has an etendue of at least 0.5 times the detector area. Since detectors typically have an area of 25 microns in diameter, this condition requires the beam to have an etendue of at least about 245 microns.

Figure 4:
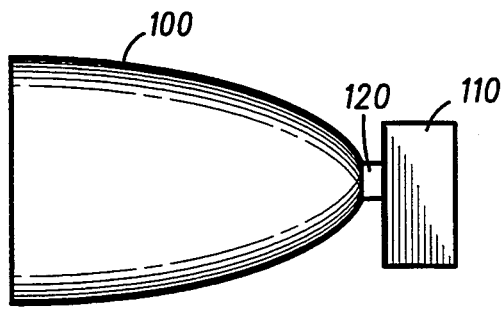
FIG. 4 shows direct contact coupling of a dielectric total internal reflection concentrator (DTIRC) to an FTIR spectrometer detector.

In another preferred embodiment shown in FIG. 4, the CPC 100 is a dielectric total internal reflection concentrator (DTIRC), and the detector 110 is in optical contact with the concentrator output aperture. Effective optical contact is required to avoid the internal reflections which would occur if there were an air gap at the output aperture. Optical contact can be achieved through use of a coupling medium 120 whose index is at least 0.9× the index of the DTIRC CPC 100 or the index of the detector 110, whichever is lower. In another preferred embodiment, the CPC 100 and the detector 110 may be fabricated of the same material.

Figure 5:
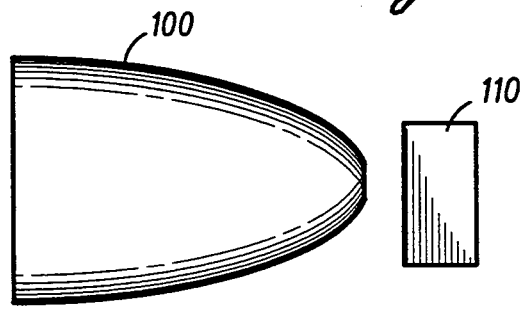
FIG. 5 illustrates the coupling of an FTIR detector to a DTIRC with a gap therebetween.

In another preferred embodiment shown in FIG. 5, the gap between the detector 110 and CPC 100 is between 0.1 to 1.0× the output aperture diameter, and the CPC 100 is designed to have an output angle of less than ±90 degrees to minimize the amount of light which leaves the aperture and misses the detector 110. The non-imaging CPC 100 can be designed to have an output angle between ±45 and ±90 degrees, although the concentration increases with output angle according to Eq. (4).

Figure 6:
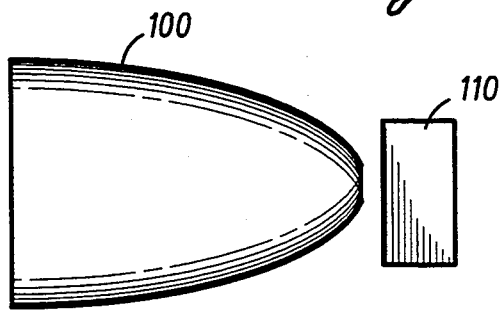
FIG. 6 shows the coupling of an FTIR detector to a DTIRC with a thinner gap than FIG. 5 for thermal insulation of the detector from the concentrator.

In another preferred embodiment shown in FIG. 6, there is a small gap between the detector 110 and the CPC 100 output aperture in order to thermally insulate the detector 110 from the CPC 100. In one preferred embodiment this gap is less than about 0.1× the output aperture diameter, and the CPC 100 is designed to have an output angle of about ±90 degrees. In another preferred embodiment the gap is less than about $\lambda(\text{light})/10$. A detailed example has been described hereinbefore.

While preferred embodiments have been described herein, it will be clear to those skilled in the art that various changes and modifications can be made without departing from the invention in its broader aspects as set forth in the claims provided hereinafter.

What is claimed is:

1. A fourier transform infrared spectrometer, comprising:
    means for providing an infrared beam;
    means for detecting an infrared beam; and
    a dielectric concentrator coupled to said means for detecting by means consisting of a good optical coupling, said concentrator being a non-imaging concentrator comprising a convergent concentrator having an output aperture with an output aperture diameter and further having reflecting surface providing a light output angle $\theta_1$ between 45° and 90° as seen by said means for detecting and said concentrator and said means for detecting having a spacing therebetween of less than 0.1 times the output aperture diameter of said concentrator, thereby minimizing the amount of the light which leaves the output aperture and misses the detector.

2. The Fourier transform infrared spectrometer as defined in claim 1 wherein said concentrator comprises a compound parabolic concentrator.

3. The Fourier transform infrared spectrometer as defined in claim 1 wherein said concentrator comprises a compound elliptical concentrator.

4. The Fourier transform infrared spectrometer as defined in claim 1 wherein said means for providing the infrared beam generates an output beam having an etendue of at least 0.002 mm$^2$.

5. The Fourier transform infrared spectrometer as defined in claim 4 wherein said means for detecting has an active detector area less than or equal to the etendue of said output beam.

6. The Fourier transform infrared spectrometer as defined in claim 1 wherein said good optical coupling has an index of refraction 0.9 times the index of said concentrator.

7. The Fourier transform infrared spectrometer as defined in claim 1 wherein said concentrator and said means for detecting are constructed of the same material.

8. A method of performing Fourier transform spectrometry on a specimen, comprising the steps of:
    providing an infrared spectrometer for generating an infrared beam and outputting said infrared beam;
    providing a specimen and impinging said infrared beam on said specimen;
    providing means for detecting said infrared beam after interacting with said specimen;
    providing a dielectric concentrator coupled to said means for detecting by forming a good optical coupling therebetween, said concentrator being a non-imaging concentrator comprised of a convergent concentrator having an output aperture with an output aperture diameter and further having a reflecting surface providing a light output angle $\theta_1$ between 45° and 90° as seen by said means for detecting and said concentrator and said means for detecting having a spacing therebetween of less than 0.1 times the output aperture diameter of said concentrator, thereby minimizing the amount of the light which leaves the output aperture and misses the detector; and
    detecting said infrared beam output from said concentrator using said means for detecting to generate a signal for processing to perform said Fourier transform spectrometry.

* * * * *

UNITED STATES PATENT AND TRADEMARK OFFICE
CERTIFICATE OF CORRECTION

PATENT NO. : 5,416,325

DATED : May 16, 1995

INVENTOR(S) : Joseph T. Buontempo et. al

It is certified that error appears in the above-identified patent and that said Letters Patent is hereby corrected as shown below:

In Column 1, line 4, insert -- The United States Government has certain rights in this invention pursuant to Grant #8919570 from National Science Foundation to the University of Chicago -- .

Signed and Sealed this

Sixth Day of July, 1999

*Attest:*

Q. TODD DICKINSON

*Attesting Officer*     *Acting Commissioner of Patents and Trademarks*